DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 4

T903,002

RECOVERING VALUES FROM MONOVINYL-ACETYLENE CATALYST TARS

Alfred P. Kottenhahn, Louisville, Ky., assignor to E. I. du Pont de Nemours and Company, Wilmington, Del.

Filed Jan. 7, 1971, Ser. No. 104,748

Int. Cl. B01d *11/04;* C01g *3/04*

U.S. Cl. 23—312

No Drawing. 14 Pages Specification

Cuprous chloride is recovered from tarred catalyst formed in the presence of a reaction control diluent during the catalytic dimerization of acetylene to monovinylacetylene. Water, preferably having an aliphatic nitrile compound such as acetonitrile dissolved therein, is mixed with the tarred catalyst to form a tar concentrate containing the values to be recovered. The tar concentrate is mixed with a concentrated aqueous solution of monomethylamine hydrochloride (preferably 20–70%) to form a two-phase system. One phase is aqueous and contains the monomethylamine hydrochloride and a substantial portion of the cuprous chloride which was in the tar, and the other is a tar phase and contains reaction control diluent, tar formed during the dimerization reaction, and any remaining cuprous chloride. The phases are separated and normally 50–60% of the cuprous chloride is recovered from the aqueous phase. In a preferred aspect, reaction control diluent, e.g. diphenylether, also is recovered, from the tar phase, by extracting that phase with a hydrocarbon solvent, followed by separating the solvent, containing any dissolved control diluent, from the tar phase, and recovering the diluent.